United States Patent Office 3,428,200
Patented Feb. 18, 1969

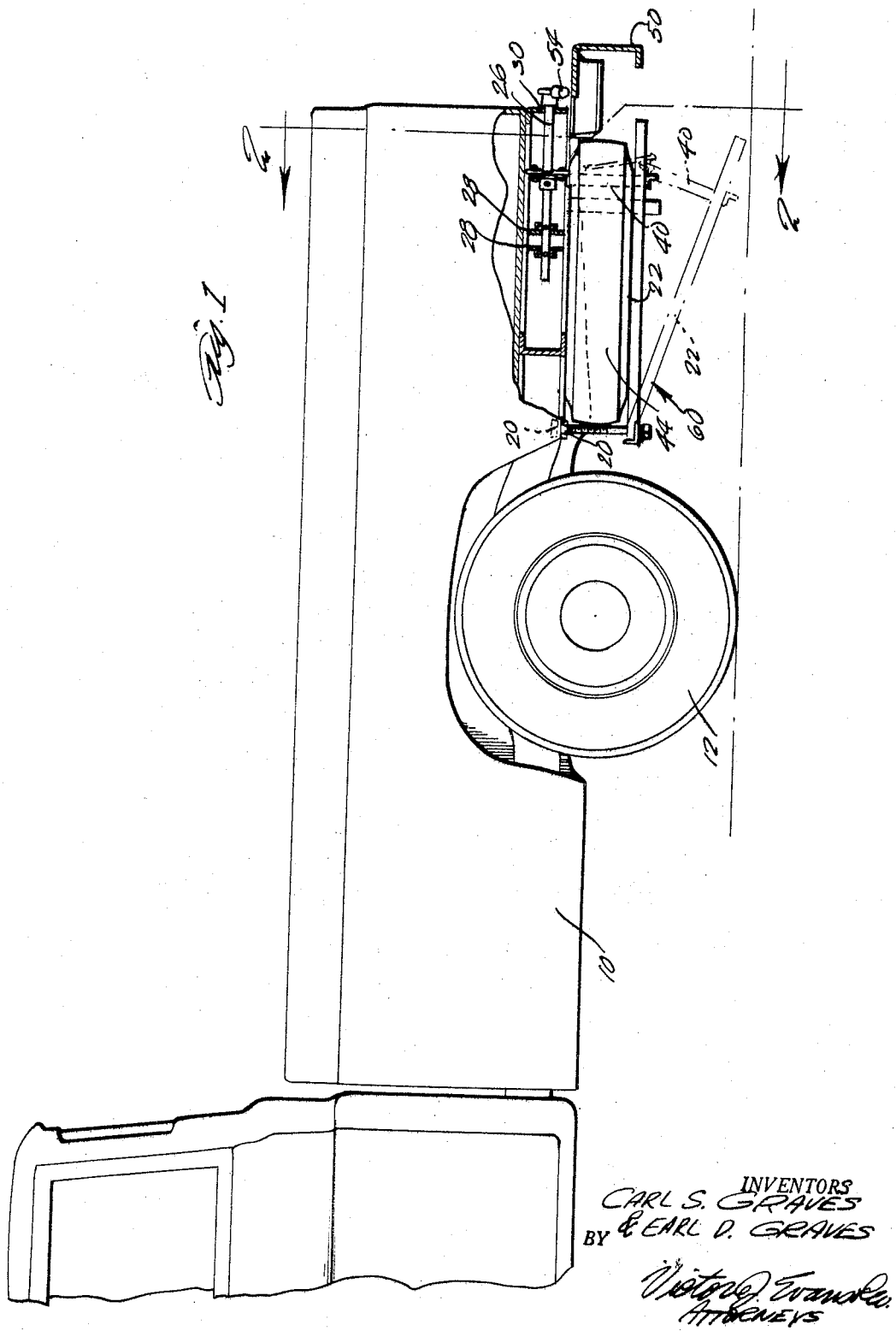

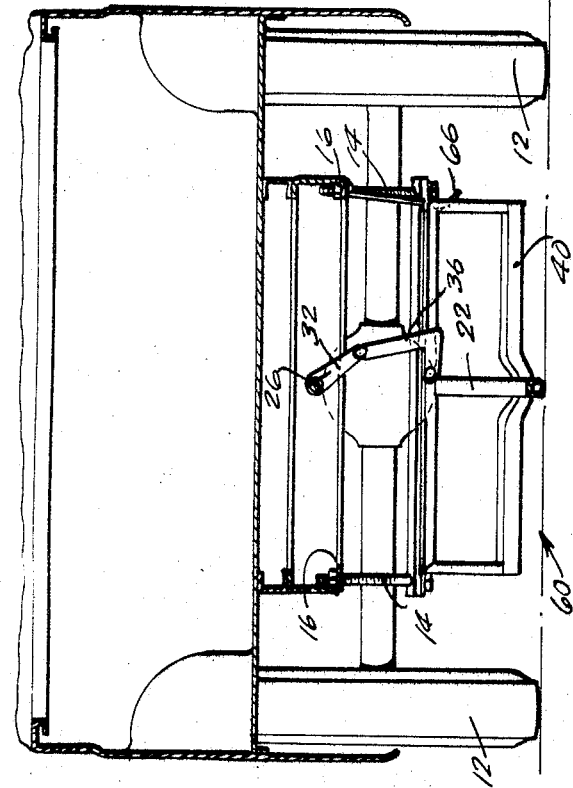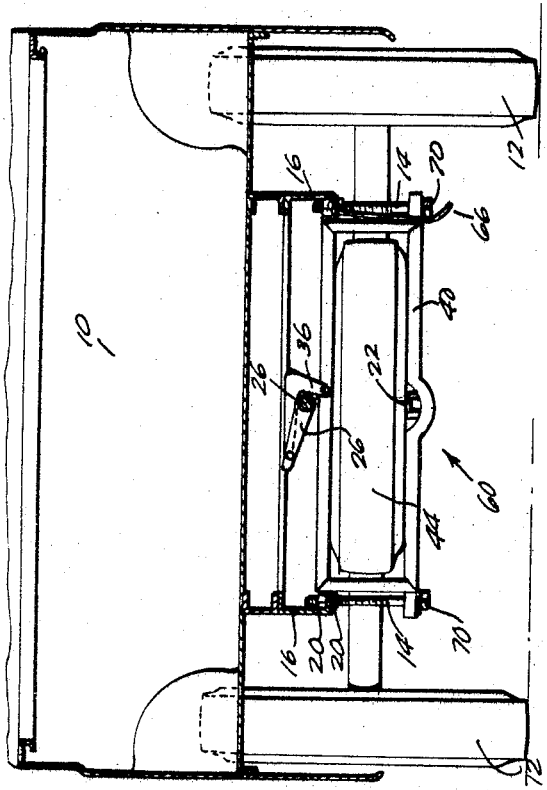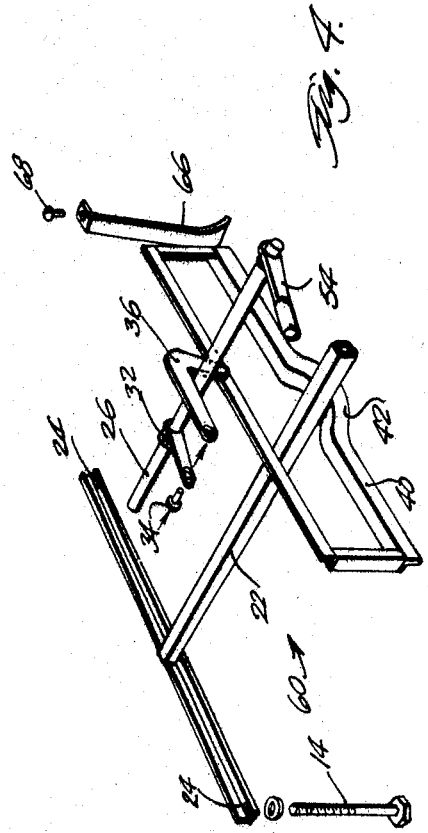

3,428,200
SPARE TIRE CARRIER
Carl S. Graves and Earl D. Graves, both of P.O. Box 217, San Simon, Ariz. 85632
Continuation of application Ser. No. 533,988, Mar. 14, 1966. This application Dec. 13, 1967, Ser. No. 697,545
U.S. Cl. 214—454                     1 Claim
Int. Cl. B62d 43/04

ABSTRACT OF THE DISCLOSURE

A spare tire carrier having a bottom rack for carrying a spare tire, a T-shaped rack, a set of mounting bolts to secure the T-shaped rack to the vehicle, a turn shaft mounted for rotation on the vehicle frame, a link arm fixedly mounted on the shaft for rotation therewith, the crank arm of L-shaped configuration mounted from the link arm at one end thereof by a pin, a lift yoke frame having a pin connection to the crank arm and engagingly coupled to the free end of the T-rack and adapted to be raised and lowered by the crank arm upon rotation of the turn shaft.

Cross-references to related applications

This application is a continuation of original application Ser. No. 533,988, filed Mar. 14, 1966, for Spare Tire Carrier, to be abandoned.

Background of the invention (1) The present invention relates to an improved spare tire carrier for use in attachment to pick-up trucks, or station wagons, or other type vehicles having a similar rear end frame construction, and more particularly relates to a simple and expedient mechanism having a hinged frame that can be raised, lowered, and locked in place automatically in the raised position.

(2) Heretofore, it has been difficult to manipulate and automatically lock a spare tire carrier located at the rear and underneath the vehicle body. It was particularly troublesome to get the tire into and out of the more or less inaccessible tire rack while manipulating and locking or unlocking the control lever for the tire carrier.

Summary of the invention

An object of the present invention is to provide an improved spare tire rack having a simple and improved crank arm mechanism for raising and lowering the tire frame.

A further object of the present invention is to provide a spare tire rack that can be used so that the tire can be installed and removed even though the pick-up or other vehicle to which it is applied may have a bumper or the tire may be similarly installed and/or removed when the vehicle in which the rack is applied is loaded.

A further object of the present invention is to provide an adjustable spare tire rack so that the rack securely retains in position the tire, whether it is of a large size or small size.

A further object is to provide a lock bolt for preventing the tire carrier from bouncing down accidentally when the vehicle travels over rough bumps and the like.

Brief description of the drawings

FIG. 1 is a side elevation view of a vehicle showing in broken away cross section the manner in which the improved spare tire carrier is installed on such vehicle.

FIG. 2 is a cross sectional view of the vehicle and improved spare tire carrier of the invention taken along lines 2—2.

FIG. 3 is a cross sectional view which would be taken along lines 2—2 also, but when the improved spare tire carrier or rack of the invention is in the lowermost position.

FIG. 4 shows a generally exploded perspective view of many component parts of the frame and crank-lock mechanism of the spare tire carrier.

Description of the preferred embodiment

Referring now to the drawings there is shown a vehicle 10 having a rear and substantially flat under-frame disposed generally aft of the rear wheels 12, 12 and from which there is securely suspended a set of bolts 14, 14 extending downwardly from the frame member 16, 16. The frame 16, 16 may be the main frame of the chassis or an auxiliary frame disposed in supporting relation therefrom.

The bolts 14, 14 are securely mounted from the frame 16, 16 respectively by pairs of nuts 20, 20 as illustratively shown in FIGS. 1 and 2. At the distal end of the bolts 14, 14 there is secured the upper extremities of a T-frame 22, the bolts 14, 14 passing through enlarged openings or holes 24, 24 of the T-frame. These holes 24, 24 are sufficiently larger than the traversing diameter of the bolts 14, 14, so that sufficient play is provided to allow a hinged effect in the T-frame in moving from the position of FIG. 2 to that of FIG. 3 which is illustratively shown in FIG. 1.

There is mounted an activating rockshaft 26 which is coaxially mounted along the length of the vehicle and generally centrally disposed thereof as shown. Thus, the activating rockshaft 26 is mounted on the frame by bearing members 28, 28, 30. Intermediate the bearing members 28 and 30 is fixed a crank arm 32 on the activating rockshaft 26 to which is pivotally connected by a pin 34 the outer end of the horizontal arm of an inverted L-shaped bell crank 36 having the lower end of its vertical arm pivotally connected to a yoke 40. The yoke 40 has a slight recess or depression 42 so that the T-frame 22 extends and is mounted from the yoke 40 without interfering with the tire 44 being inserted through the rectangular or parallelogram configuration of the yoke 40.

This improved spare tire rack is useful even though there may be a bumper 50 installed on the vehicle 10. The rear end of the activating rockshaft 26 has a turn handle 54 connected thereto to enable the shaft 26 to be turned when desired. The tire is maintained securely in place so that the tire cannot be removed from the carrier 60 in view of the construction and position of the carrier on the vehicle. The carrier may be locked in place automatically when a strap 66 having a bolt 68 mounting it in place, and thus the strap provides a guide for the tire carrier frame 22 and 40 to slide up into position. The actuating rockshaft 26 is locked in place at completing a half turn rotation in a counterclockwise direction when viewing FIG. 3, by engagement of the horizontal leg of the bell crank 36 with the top of the actuating rockshaft.

Different sized tires may be stored in the tire carrier and the length of the bolts 14, 14 may be adjusted by turning the nuts 70 thereon to adjust for smaller or larger sized tires, as desired.

The crank arm shaft 26 having the link 32, the crank 36 of L-shaped configuration provide the essential ingredients of the unique operation and cooperation of the several elements of the improved spare tire carrier so that when the carrier 60 is swung up from lowered position, FIG. 2, to its raised position, FIG. 3, the carrier is automatically locked in raised position by the rotation of the rockshaft counterclockwise to bring the horizontal arm, FIG. 3, of the bell crank 37 over and in contact with the top of the rockshaft while at the same time moving the pivotal connections of the bell crank 36 with the crank 32 and carrier 60 into an over-center plane relative to the axis of rotation of the rockshaft.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claim are intended to be included herein.

We claim:

1. A spare tire carrier for a vehicle having a frame comprising in combination:
    (A) a carrier for receiving and supporting a spare tire,
    (B) means for pivotally mounting said carrier to swing about a horizontal axis on vehicle frame,
    (C) an activating rockshaft rotatably supported on said vehicle frame,
    (D) a crank arm fixed to said actuating rockshaft,
    (E) an inverted L-shaped bell crank having a horizontal arm pivotally mounted at its outer end to the outer end of said crank arm extending over the top of said rockshaft and having a vertical arm pivotally connected at its lower end to the outer free swing portion of said carrier,
    (F) and means on said actuating rockshaft for raising and lowering said carrier relative to said vehicle frame.

References Cited

UNITED STATES PATENTS

| 2,563,810 | 8/1951 | Ballard | 214—451 |
| 2,645,394 | 7/1953 | De Bord | 214—454 |

HUGO O. SCHULZ, *Primary Examiner.*

U.S. Cl. X.R.

224—42.21